United States Patent
Oteri et al.

(10) Patent No.: US 12,490,306 B2
(45) Date of Patent: Dec. 2, 2025

(54) COMMUNICATIONS WITHIN A USER EQUIPMENT—INITIATED CHANNEL OCCUPANCY TIME

(71) Applicant: Apple Inc., Cupertino, CA (US)

(72) Inventors: Oghenekome Oteri, San Diego, CA (US); Huaning Niu, San Jose, CA (US); Hong He, San Jose, CA (US); Haitong Sun, Cupertino, CA (US); Chunxuan Ye, San Diego, CA (US); Wei Zeng, Saratoga, CA (US); Dawei Zhang, Saratoga, CA (US)

(73) Assignee: Apple Inc., Cupertino, CA (US)

(*) Notice: Subject to any disclaimer, the term of this patent is extended or adjusted under 35 U.S.C. 154(b) by 566 days.

(21) Appl. No.: 17/748,884

(22) Filed: May 19, 2022

(65) Prior Publication Data

US 2022/0394769 A1    Dec. 8, 2022

Related U.S. Application Data

(60) Provisional application No. 63/196,623, filed on Jun. 3, 2021.

(51) Int. Cl.
| | |
|---|---|
| *H04W 72/0446* | (2023.01) |
| *H04W 72/1263* | (2023.01) |
| *H04W 74/00* | (2009.01) |
| *H04W 74/08* | (2009.01) |
| *H04W 74/0816* | (2024.01) |
| *H04W 72/23* | (2023.01) |

(52) U.S. Cl.
CPC ... *H04W 74/0816* (2013.01); *H04W 72/1263* (2013.01); *H04W 74/002* (2013.01); *H04W 74/0866* (2013.01)

(58) Field of Classification Search
CPC ........ H04W 74/0816; H04W 74/0866; H04W 74/004; H04W 72/1263; H04W 72/002; H04W 72/23; H04L 5/0053; H04L 5/0094; H04L 5/0446
USPC ......................................... 370/329, 330, 341
See application file for complete search history.

(56) References Cited

U.S. PATENT DOCUMENTS

| | | | |
|---|---|---|---|
| 11,071,139 | B2 | 7/2021 | Talarico et al. |
| 2018/0220459 | A1 | 8/2018 | Park et al. |
| 2020/0280971 | A1* | 9/2020 | Moon ................ H04L 5/0053 |

(Continued)

FOREIGN PATENT DOCUMENTS

| | | | |
|---|---|---|---|
| CN | 112075046 A | 12/2020 | |
| EP | 3809785 A1 * | 4/2021 | ............ H04W 72/23 |

(Continued)

OTHER PUBLICATIONS

3rd Generation Partnership Project; Technical Specification Group Radio Access Network; NR; Physical layer procedures for control (Release 16), 3GPP TS 38.213 V16.5.0, Mar. 2021, 183 pages (Year: 2021).*

(Continued)

*Primary Examiner* — Christopher M Crutchfield
*Assistant Examiner* — Syed Ahmed
(74) *Attorney, Agent, or Firm* — Kilpatrick Townsend & Stockton LLP

(57) ABSTRACT

The present application relates to devices and components including apparatus, systems, and methods for sharing a user equipment—initiated channel occupancy time.

20 Claims, 10 Drawing Sheets

(56) References Cited

U.S. PATENT DOCUMENTS

| | | | |
|---|---|---|---|
| 2021/0014892 A1 | 1/2021 | Xue et al. | |
| 2022/0210827 A1* | 6/2022 | Wang | H04W 16/14 |
| 2022/0377795 A1* | 11/2022 | Bhattad | H04W 74/0875 |

FOREIGN PATENT DOCUMENTS

| | | | | |
|---|---|---|---|---|
| WO | 2019192285 A1 | 10/2019 | | |
| WO | 2020033623 | 2/2020 | | |
| WO | WO-2020033623 A1 * | 2/2020 | | H04L 1/1854 |
| WO | 2020097218 A1 | 5/2020 | | |
| WO | 2020162804 | 8/2020 | | |
| WO | 2020162804 A1 | 8/2020 | | |
| WO | 2020168320 A1 | 8/2020 | | |
| WO | WO-2021007505 A1 * | 1/2021 | | H04W 72/21 |
| WO | 2021062602 A1 | 4/2021 | | |
| WO | 2021097632 A1 | 5/2021 | | |
| WO | 2021062602 | 8/2021 | | |

OTHER PUBLICATIONS

LTE;v5G; Physical layer procedures for shared spectrum channel access (3GPP TS 37.213 version 16.3.0 Release 16) (Year: 2020).*
3GPP TS 38.213 V16.5.0 (Mar. 2021), "3rd Generation Partnership Project; Technical Specification Group Radio Access Network; NR Physical layer procedures for control' (Release 16)"; (Year: 2021).*
LTE, 5G; "Physical layer procedures for shared spectrum channel access" (3GPP TS 37.213 version 16.3.0 Release 16) (Year: 2020); (Year: 2020).*
3rd Generation Partnership Project; Technical Specification Group Radio Access Network; Physical layer procedures for shared spectrum channel access (Release 16), 3GPP TS 37.213 V16.5.0, Mar. 2021, 27 pages.
3rd Generation Partnership Project; Technical Specification Group Radio Access Network; NR; Physical layer procedures for control (Release 16), 3GPP TS 38.213 V16.5.0, Mar. 2021, 183 pages.
3rd Generation Partnership Project; Technical Specification Group Radio Access Network; NR; Physical layer procedures for data (Release 16), 3GPP TS 38.214 V16.5.0, Mar. 2021, 171 pages.
3rd Generation Partnership Project; Technical Specification Group Radio Access Network; NR; Radio Resource Control (RRC) protocol specification (Release 16), 3GPP TS 38.331 V16.4.1, Mar. 2021, 949 pages.
3rd Generation Partnership Project; Technical Specification Group Radio Access Network; Study on NR-based access to unlicensed spectrum (Release 16), 3GPP TR 38.889 V16.0.0, Dec. 2018, 119 pages.
Kedem et al., UORA Enhancements to address RTA, Huawei, Institute of Electrical and Electronics Engineers (IEEE), Doc: IEEE 802.11-20-1902/r0, Dec. 2020, 16 pages.
Technical Specification entitled: 3rd Generation Partnership Project; Technical Specification Group Radio Access Network; Physical layer procedures for shared spectrum channel access (Release 17), 3GPP TS 37.213 V17.5.0 (Mar. 2023), Keywords Radio Layer 1 in 39 pages.
Technical Specification entitled: 3rd Generation Partnership Project; Technical Specification Group Radio Access Network; NR; Physical layer procedures for control (Release 17), 3GPP TS 38.213 V17.5.0 (Mar. 2023), Keywords Radio Layer 3GPP, New Radio, Layer 1 in 262 pages.
Technical Specification entitled: 3rd Generation Partnership Project; Technical Specification Group Radio Access Network; NR; Radio Resource Control (RRC) protocol specification (Release 17), 3GPP TS 38.331 V17.4.0 (Mar. 2023) in 1324 pages.
Technical Report entitled: 3rd Generation Partnership Project; Technical Specification Group Radio Access Network; Study on NR-based access to unlicensed spectrum (Release 16), 3GPP TR 38.889 V16.0.0 (Dec. 2018), Keywords NR, Radio, Unlicensed Spectrum, Physical Layer in 119 pages.
Khorov, et al., article entitled: Current Status and Directions of IEEE 802.11be, the Future Wi-Fi 7, IEEEAccess, Multidisciplinary, Rapid Review, Open Access Journal, Digital Object Identifier 10.1109/ACCESS.2020.2993448, https://creativecommons.org/licenses/by/4.0/ vol. 8, 2020, Received Apr. 15, 2020, accepted May 1, 2020, date of publication May 8, 2020, date of current version May 21, 2020 in 25 pages.
Lagen, et al., article entitled: New Radio Beam-based Access to Unlicensed Spectrum: Design Challenges and Solutions, Centre Tecnol'ogic de Telecomunicaciones de Catalunya (CTTC/CERCA), Barcelona, Spain, InterDigital Communications, Inc., Melville, New York, USA, 2019 IEEE, arXiv:1809.10443v2 [cs.NI] Oct. 23, 2019 in 30 pages.
EPO Form 1703 01.91TRI, CF Form 1507, Application No. 22174247.1 in 7 pages.
Report entitled: On the enhancements for unlicensed band URLLC/ IIoT Document for: Discussion and Decision, 3GPP TSG RAN WG1 Meeting #104b-e, R1-2102696, Agenda Item: 8.3.2, Source: MediaTek Inc., e-Meeting, Apr. 12-20, 2021, server date Apr. 7, 2021; downloaded by EPO on Jul. 12, 2022 in 8 pages.
Article entitled, "Enhancements for unlicensed band URLLC/ IIoT", 3GPP TSG RAN WG1 #104b-e, R1-2103612, e-Meeting, dated Apr. 12-20, 2021 in 7 pages.
Office Action issued in Japan Application No. JP2022-090684, dated Jun. 8, 2023 in 11 pages.
On the Enhancements for Unlicensed Band URLLC/IIoT, MediaTek Inc., 3GPP TSG RAN WG1 Meeting #104b-e, R1-2102696, Apr. 12-20, 2021, 8 pages.
European Patent Application No. 22174247.1, Extended European Search Report, Nov. 7, 2022, 11 pages.
Office Action issued in Japan Application No. JP2022-090684, dated Nov. 9, 2023 in 6 pages.
Chinese Patent Application No. 202210614869.X , "Office Action", Nov. 1, 2024, 24 pages.
European Patent Application No. 22174247.1 , "Office Action", Dec. 10, 2024, 9 pages.
Office Action issued in China Application No. CN202210614869.X, dated Apr. 19, 2025 in 8 pages.
China Patent Application No. 202210614869.X, Notice of Decision to Grant, Aug. 1, 2025, 8 pages.

\* cited by examiner

COMMUNICATIONS WITHIN A USER EQUIPMENT—INITIATED CHANNEL OCCUPANCY TIME

CROSS-REFERENCE TO RELATED APPLICATION

This application claims the benefit of U.S. Provisional Application No. 63/196,623, filed Jun. 3, 2021, which is herein incorporated by reference in its entirety for all purposes.

BACKGROUND

Third Generation Partnership Project (3GPP) Fifth Generation (5G) New Radio (NR) provides for communication between network devices including user equipment (UEs) and next generation Node Bs (gNBs). Operation and coordination of these network devices is defined through Technical Specifications (TSs) periodically released by 3GPP.

DETAILED DESCRIPTION

Figure 1:
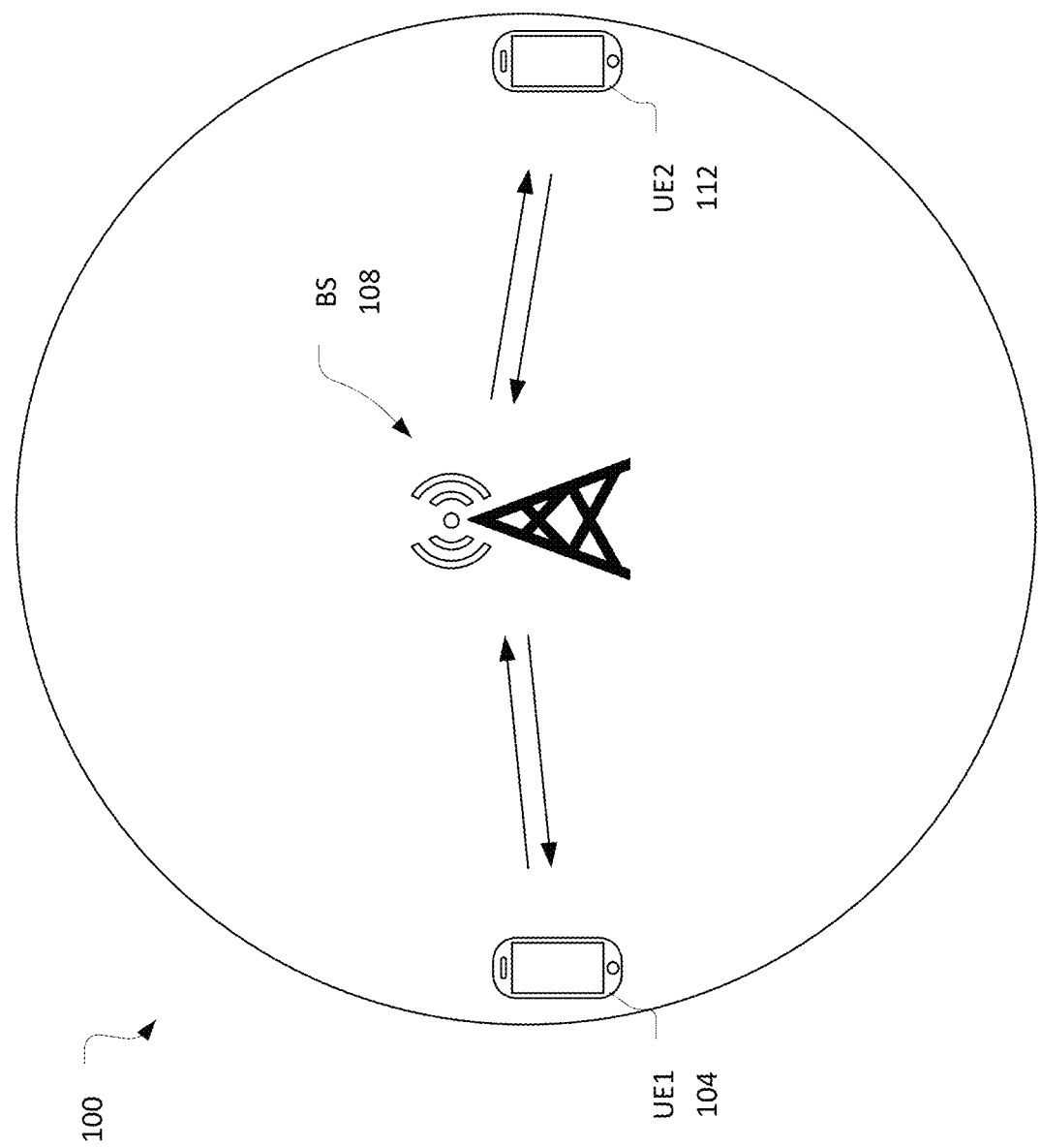
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, a programmable system-on-a-chip (SoC)), or digital signal processors (DSPs) that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, or network interface cards.

The term "user equipment" or "UE" as used herein refers to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware element(s). A "virtualized resource" may refer to compute, storage, or network resources provided by virtualization infrastructure to an application, device, or system. The term "network resource" or "communication resource" may refer to resources that are accessible or utilized by computer devices/systems via a communications network. The term "system resources" may refer to any kind of shared entities to provide services and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or virtualized network function.

The term "information element" refers to a structural element containing one or more fields. The term "field" refers to individual contents of an information element or a data element that contains content. An information element may include one or more additional information elements.

FIG. 1 illustrates a network environment 100 in accordance with some embodiments. The network environment 100 may include UEs such as UE 104 and UE 112. The network environment 100 may further include a base station 108 that provides one or more wireless access cells through which the UEs 104/112 may communicate with the base station 108. In some aspects, the base station 108 may be a gNB that provides a 3GPP New Radio (NR) cell or an evolved node B (eNB) that provides a 3GPP Long Term Evolution (LTE) cell. The air interfaces over which the UE 104 and base station 108 communicate may be compatible with 3GPP TSs such as those that define 5G NR or LTE system standards and may occupy frequency bands in Frequency Range 1 (FR1) (e.g., below 7.225 GHz), Frequency Range 2 (FR2) (e.g., 24.250 GHz and above, also called mmWave), or higher frequency bands (e.g., between 52.6 GHz and 71 GHz or 114.25 GHz).

The network environment 100 may operate on a licensed or unlicensed spectrum. When operating on the unlicensed spectrum, the devices of the network environment 100 may operate in compliance with NR-unlicensed (NR-U) specifications. In NR-U, the devices of the network environment 100 may perform channel access procedures to determine whether one or more channels in the unlicensed spectrum are unavailable or otherwise occupied prior to transmitting in the unlicensed spectrum. A channel may refer to a carrier or part of a carrier that includes a contiguous set of resource blocks (RBs). Except as otherwise described herein, the channel access procedures may be similar to those described in 3GPP TS 37.213 v16.5.0 (2021-03).

The channel access procedure may include sensing a medium within a sensing slot that has a duration of, for example, 9 microseconds, to determine whether the channel is available for performing transmissions. The channel access procedure may include, or otherwise be referred to as, a listen-before-talk (LBT) procedure. If the detected power over a period of time (for example, four microseconds) within the sensing slot duration is less than an energy detection (ED) threshold, the sensing slot duration may be considered idle. Otherwise, the sensing slot duration may be considered busy.

After a device performs the channel access procedures and determines a number of sensing slots are idle, the device may occupy the channel for a period of time referred to as a channel occupancy time (COT). 3GPP TS 37.213 describes the sensing slots used to determine whether the device is able to occupy the channel for both downlink and uplink channel access procedures.

If a UE performs the channel access procedure to acquire the channel, the resulting COT may be referred to as a UE-initiated COT. A UE-initiated COT may be defined with respect to either a configured grant physical uplink shared channel (PUSCH) or a scheduled uplink (UL)).

3GPP TS 37.213 describes specific instances in which a UE-initiated COT may be shared with a gNB. For example, a gNB may be allowed to transmit control/broadcast signals/channels for any UEs as long as the transmission contains transmissions for the UE that initiated the COT or DL signal/channels (for example, physical downlink shared channel (PDSCH), physical downlink control channel (PDCCH), or reference signals) meant for the UE that initiated the COT. The gNB may configure an ED threshold that a UE is to apply when initiating a channel occupancy that is to be shared with the gNB. If the ED threshold is not configured, the gNB's transmission in the UE-initiated COT may include only control/broadcast signal/channel transmissions of up to 2/4/8 orthogonal frequency division multiplexing (OFDM) symbols in duration for 15/30/60 kHz subcarrier spacing (SCS). When absence of another technology (for example, a wireless local area network (WLAN) technology) sharing the channel cannot be assumed based on, for example, regulation, the gNB-configured ED threshold for initiating the channel occupancy is determined based on the maximum gNB transmit power.

In various instances, network functionality and flexibility may be increased by enabling a base station that shares a UE-initiated COT to also transmit unicast information to, or receive unicast information from, a UE other than the initiating UE. Among other things, this may be useful to ensure channel access to UEs in an ultra-reliable low latency communication (URLLC) use case scenario. For example, allowing a base station to temporarily capture a portion of a UE-initiated COT for transmission of URLLC traffic to another UE may enable fair and efficient utilization of the unlicensed spectrum. Embodiments of the present disclosure describe alternate UE transmission/reception in a UE-initiated COT in a manner that increases the efficient spectrum utilization while maintaining fair access to the unlicensed spectrum among devices utilizing NR-U and other technologies.

For purposes of the present description, the UE 104 may be referred to as the initiating UE, for example, the UE that performs the channel access procedure to acquire the COT to be shared with the base station 108. The base station 108 may capture a portion of the UE-initiated COT from the UE 104 for transmissions to/from one or more other UEs, for example, UE 112. The UE 112 may also be referred to as the non-initiating UE.

Figure 2:
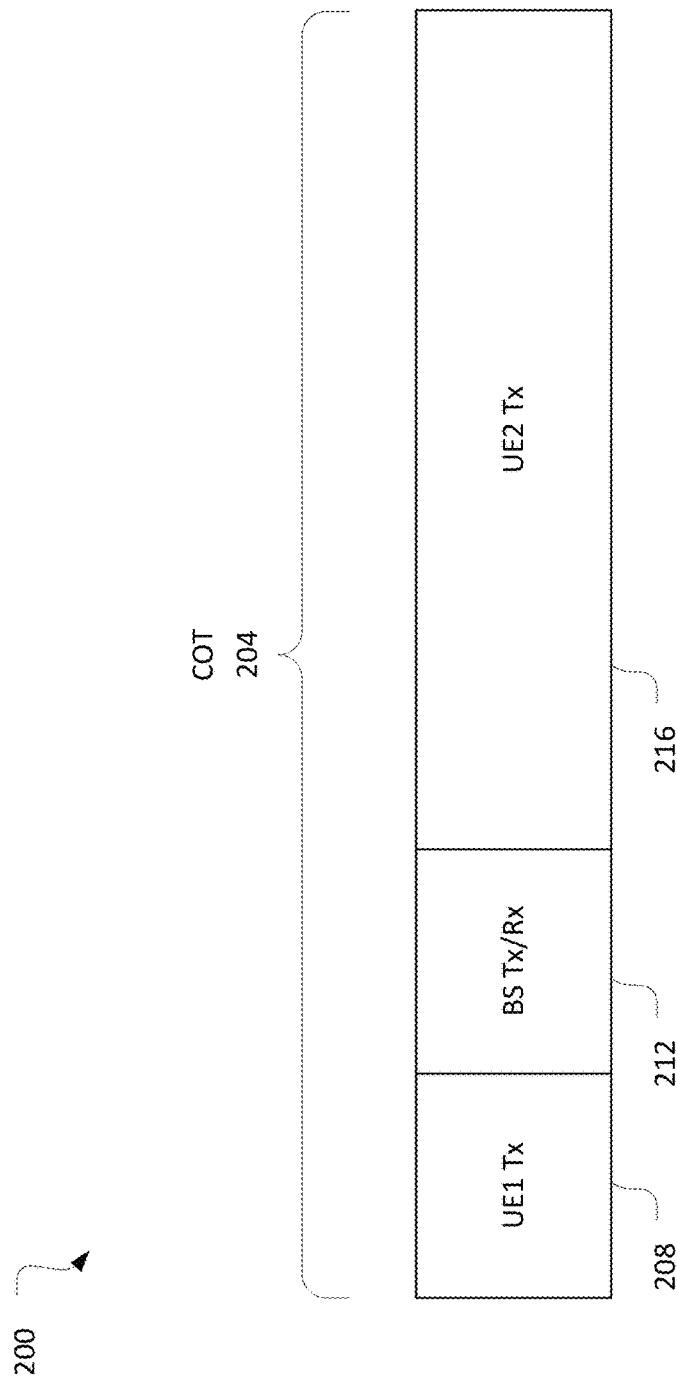
FIG. 2 illustrates a channel access diagram in accordance with some embodiments.
Figure 3:
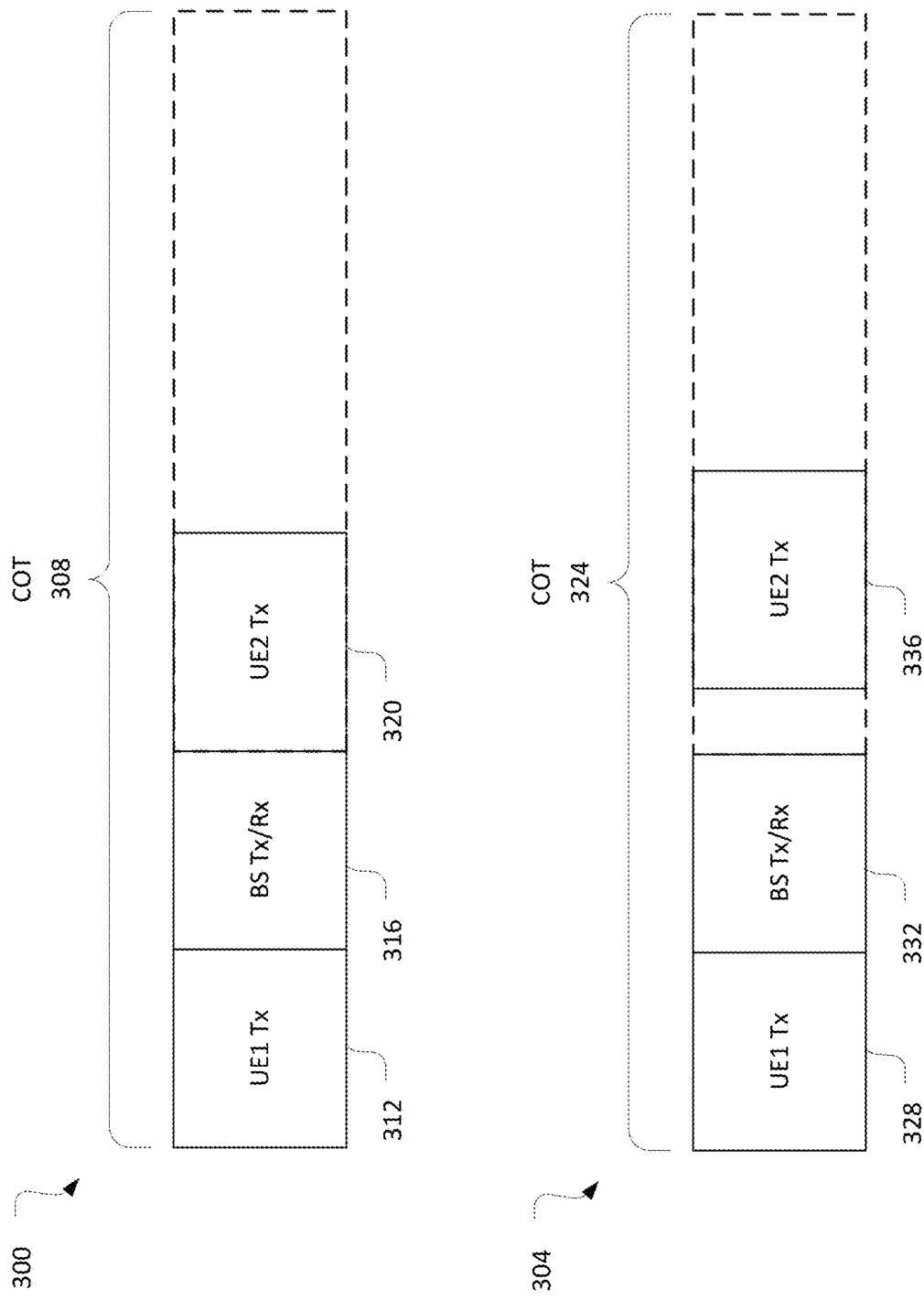
FIG. 3 illustrates another channel access diagram in accordance with some embodiments.
Figure 4:
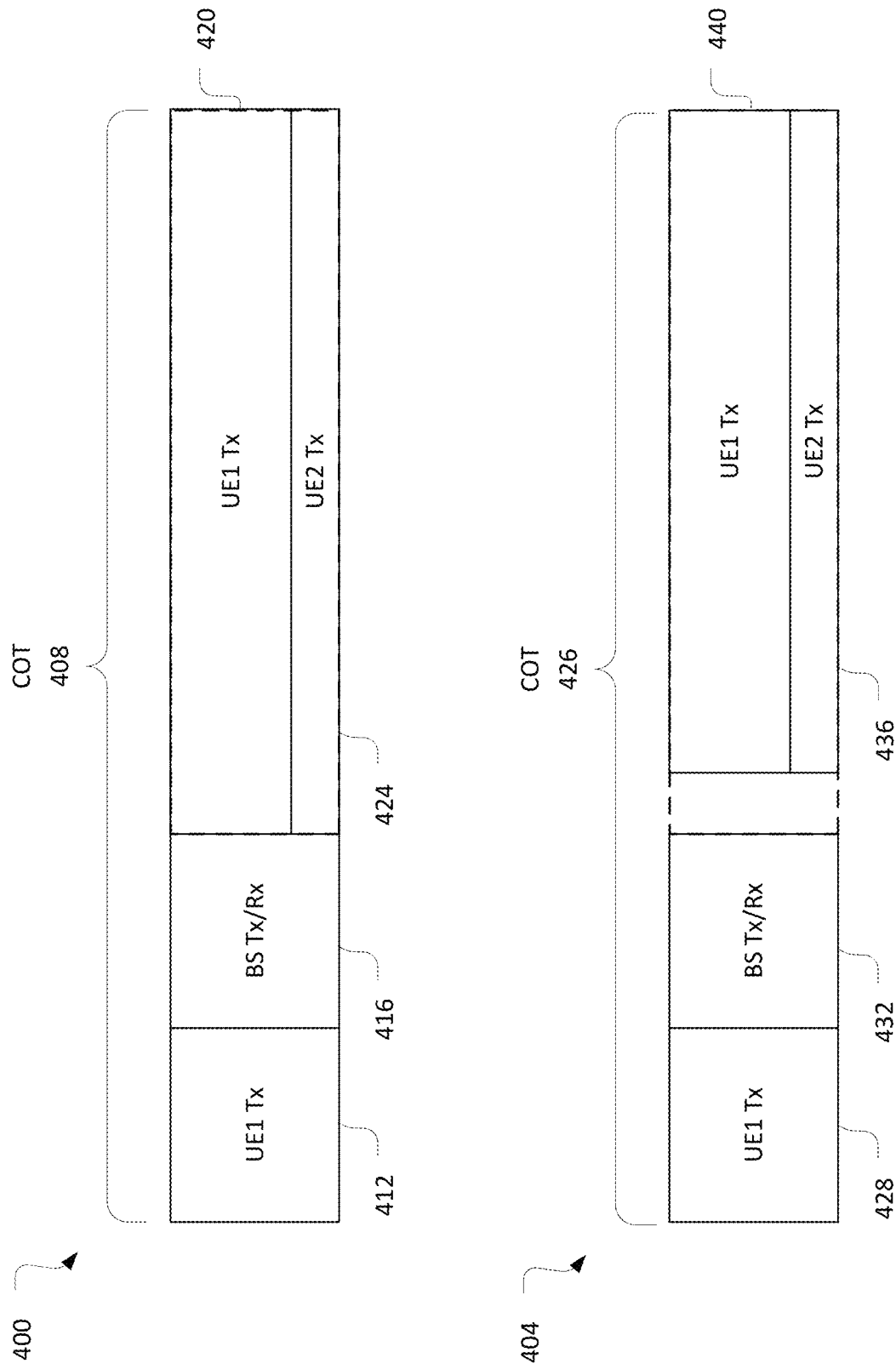
FIG. 4 illustrates another channel access diagram in accordance with some embodiments.

In a first aspect of the disclosure, the base station 108 may capture a UE-initiated COT after the UE 104 is done transmitting and schedule the one or more additional UEs, for example, UE 112 within the UE-initiated COT. FIGS. 2-4 illustrate channel access diagrams of the first aspect in accordance with some embodiments.

FIG. 2 illustrates a channel access diagram 200 in accordance with some embodiments. The channel access diagram 200 may include a UE-initiated COT 204 that results from UE 104 successfully performing a channel access procedure and acquiring the channel. UE 104 may provide the base station 108 with information that includes an indication that the UE 104 has acquired the channel for the UE-initiated COT 204. In some embodiments, this indication may be an uplink transmission to the base station 108.

At the start of the UE-initiated COT 204, communication may be restricted to that which involves the initiating UE, UE 104. For example, communications may include unicast transmissions to/from the UE 104 and may also include transmissions from the base station 108 to other UEs as long as those transmissions were also for UE 104. Thus, the base station 108 may transmit control signals or broadcast channels to both UE 104 and UE 112. However, the base station 108 may not transmit/receive unicast transmissions having user plane data to/from UEs other than UE 104.

Upon acquiring the channel, the UE 104 may perform transmissions at UE1 Tx 208. After the UE1 Tx 208, the base station 108 may perform downlink/uplink transmissions at BS Tx/Rx 212. Through the BS Tx/Rx 212, the base station 108 may obtain the channel for another UE, for example, UE 112. Thereafter, the remaining UE-initiated COT 204 may be used for communications with UE 112. These communications may include unicast transmissions to/from the UE 112. For example, these unicast transmissions may include an uplink transmission from the UE 112 at UE2 Tx 216. In some embodiments, the communications may also include transmissions from the base station 108 to other UEs as long as those transmissions are also for UE 112.

The base station 108 may obtain the channel from the UE 104 at any of a variety of points within the UE-initiated COT 204. For example, in a first option, the base station 108 may obtain the channel from the UE 104 after the base station 108 determines transmissions to/from the UE 104 have been completed. In a second option, the base station 108 may actively cancel transmissions to/from the UE 104. Thus, in the second option, the base station 108 may cut off the transmissions to/from the UE 104. The first option may be less disruptive to the UE 104 while the second option may enable the base station 108 to acquire the channel for the UE 112 at a specific time that it is needed.

In some embodiments, the transmissions within the BS Tx/Rx 212 may include control signals sent to the UE 112 to schedule transmissions to/from the UE 112. The control signals may also have an indication of a duration of the remaining UE-initiated COT 204 that was acquired for the benefit of the UE 112.

FIG. 3 illustrates a channel access diagram 300 and a channel access diagram 304 in accordance with some embodiments. The channel access diagrams 300/304 illustrate options for restricting a transmission from UE 112 in a time-domain (for example, a number of OFDM symbols).

The channel access diagram 300 may include a UE-initiated COT 308 that results from UE 104 successfully performing a channel access procedure and acquiring the channel as discussed above. UE 104 may provide the base station 108 with information that includes an indication that the UE 104 has acquired the channel for the UE-initiated COT 308. Upon acquiring the channel, the UE 104 may perform uplink transmissions at UE1 Tx 312 and the base station 108 may perform downlink/uplink transmissions at BS Tx/Rx 316.

Sometime during BS Tx/Rx 316, the base station 108 may obtain the channel from the UE 104 for the benefit of UE 112 after which, unicast transmission/reception to/from the UE 104 may be stopped and unicast transmission/reception to/from UE 112 may be started. The base station 108 may transmit control signals in BS Tx/Rx 316 to inform the UE 104 or UE 112 of the acquisition of the channel for the benefit of UE 112. The control signals may also provide an indication of a number of symbols to which a transmit duration of UE2, for example, UE2 Tx 320, is limited. UE2 Tx 320 may not occupy the entire remaining UE-initiated COT 308. The portion of the remaining UE-initiated COT 308 may either be cancelled by the base station 108 or may revert back to the UE 104, in which case, additional unicast transmissions to/from the UE 104 may be conducted before the expiration of the UE-initiated COT 308. The base station 108 may transmit control signals to the UE 104 to either cancel the remaining COT or have control handed back to the UE 104 after transmissions to/from UE 112. The control signals may be part of the signals used to initially acquire the channel from UE 104 or may be transmitted after transmissions to/from UE 112.

The channel access diagram 304 may include a UE-initiated COT 324 that results from UE 104 successfully performing a channel access procedure and acquiring the channel as discussed above. UE 104 may provide the base station 108 with information that includes an indication that the UE 104 has acquired the channel for the UE-initiated COT 324. Upon acquiring the channel, the UE 104 may perform uplink transmissions at UE1 Tx 328, and the base station 108 may perform downlink/uplink transmissions at BS Tx/Rx 332.

Sometime during BS Tx/Rx 332, the base station 108 may obtain the channel from the UE 104 for the benefit of UE 112 after which, unicast transmission/reception to/from the UE 104 may be stopped and unicast transmission/reception to/from UE 112 may be started. These communications may include an uplink transmission from UE 112 at UE2 Tx 336. The base station 108 may transmit control signals in BS Tx/Rx 332 to inform the UE 104 or UE 112 of the acquisition of the channel for the benefit of the UE 112. The control signals may also provide an indication of a number of symbols to which a transmit duration of the UE2, UE2 Tx 336, is limited.

Unlike channel access diagram 300, the UE2 Tx 336 of channel access diagram 304 may not start immediately after the BS Tx/Rx 332. Instead, a gap may be provided so that the UE 112 may perform an LBT operation before its uplink access at UE2 Tx 336. The LBT operation may be similar to the channel access procedure discussed above with the variables (for example, selected sensing slots and ED thresholds) adjusted to accommodate specific objectives of a particular embodiment.

In some embodiments, the LBT operation performed by the UE 112 may be category three (Cat 3) LBT or a category four (Cat 4) LBT as described in, for example, 3GPP Technical Report (TR) 38.889 v16.0.0 (2018-12). A Cat 3 LBT may be performed with a random backoff with the contingent window of a fixed size. For example, a transmitting entity may draw a random number N within a contention window bounded by minimum and maximum values of N. The size of the contention window may be fixed. The random number N may be used in the LBT procedure to determine a duration of time that the channel is sensed to be idle before the transmitting entity transmits on the channel.

A Cat 4 LBT may be performed with a random backoff with a contention window of variable size. This may be similar to the Cat 3 LBT discussed above with the exception that the transmitting entity varies the size of the contention window when drawing the random number N.

In some embodiments, the LBT operation performed by the UE 112 may be a category other than 3 or 4, or may not be a defined LBT category at all, which may be the case for NR operation in higher frequencies above 52.6 GHz, for example.

FIG. 4 illustrates a channel access diagram 400 and a channel access diagram 404 in accordance with some embodiments. The channel access diagrams 400/404 illustrate options for acquiring some, but not all, COT resources for non-initiating UE communications.

The channel access diagram 400 may include a UE-initiated COT 408 that results from UE 104 successfully performing a channel access procedure and acquiring the channel as discussed above. UE 104 may provide the base station 108 with information that includes an indication that the UE 104 has acquired the channel for the UE-initiated COT 408. Upon acquiring the channel, the UE 104 may perform uplink transmissions at UE1 Tx 412 and the base station 108 may perform downlink/uplink transmissions at BS Tx/Rx 416.

Sometime during the BS Tx/Rx 416, the base station 108 may obtain a first portion of the channel from the UE 104 for the benefit of UE 112 after which, unicast transmission/reception to/from the UE 104 may be restricted to a second portion of the channel and unicast transmission/reception to/from UE 112 may be started in the first portion of the channel. The base station 108 may transmit control signals in BS Tx/Rx 416 to inform the UE 104 or UE 112 of the acquisition of the first portion of the channel for the benefit of the UE 112.

The first and second portions may be divided based on frequency, space, code, or other dimension (or some combination of these dimensions). For example, the first portion may correspond to a first set of frequencies and the second portion may correspond to a second set of frequencies that do not overlap the first set of frequencies. Alternatively, the first portion may correspond to a first set of spatial layers, spatial streams or spatial transport blocks and the second portion may correspond to a second set of spatial layers, spatial streams or spatial transport blocks that do not overlap the first set of spatial layers, spatial streams or spatial transport blocks. In this manner, the remaining UE-initiated COT 408 may be partitioned for simultaneous unicast communications with the UE 104 and the UE 112. As shown, the UE 104 may conduct transmissions at UE1 Tx 420 while the UE 112 may conduct transmissions at UE2 Tx 424.

In some embodiments, the base station 108 may transmit control signals (in BS Tx/Rx 416 or an earlier configuration) that configure the resources of the first and second portions. In other embodiments, the resources of the first/second portions may be specified in, for example, a 3GPP TS, and the control signals transmitted by the base station 108 may simply activate the portions.

The channel access diagram 404 may include a UE-initiated COT 426 that results from UE 104 successfully performing a channel access procedure and acquiring the channel as discussed above. UE 104 may provide the base station 108 with information that includes an indication that the UE 104 has acquired the channel for the UE-initiated COT 426. Upon acquiring the channel, the UE 104 may perform uplink transmissions at UE1 Tx 428 and the base station 108 may perform downlink/uplink transmissions at BS Tx/Rx 432.

Sometime during BS Tx/Rx 432, the base station 108 may obtain a first portion of the channel from the UE 104 for the benefit of UE 112 after which, unicast transmission/reception to/from the UE 104 may be restricted to a second portion of the channel and unicast transmission/reception to/from UE 112 may be started in the first portion of the channel. The base station 108 may transmit control signals in BS Tx/Rx 432 to inform the UE 104 or UE 112 of the acquisition of the first portion of the channel for the benefit of the UE 112.

Unlike channel access diagram 400, the UE2 Tx 436 of channel access diagram 404 may not start immediately after the BS Tx/Rx 432. Instead, a gap may be provided so that the UE 112 may perform an LBT operation before its uplink access at UE2 Tx 436. The LBT operation may be similar to the channel access procedure discussed above with the variables (for example, selected sensing slots and ED thresholds) adjusted to accommodate specific objectives of a particular embodiment.

In some embodiments, the UE1 Tx 440 may also start after a gap from the BS Tx/Rx 432 to accommodate an LBT procedure by the UE 104. However, in other embodiments, this gap (and the related, additional LBT procedure) may not be needed prior to transmissions from the initiating UE.

In order to maintain fair access to unlicensed spectrum among various technologies, a number of restrictions may be implemented in accordance with some embodiments. For example, it may be desirable to require that a UE have information to transmit before performing the channel access procedure to acquire the channel. This may prevent a UE from preemptively initiating a COT to acquire the channel without having a compelling need to do so.

In another example, base station transmissions to a non-initiating UE (for example, UE 112) may be limited to X symbols. The value of X may be dependent on the subcarrier spacing of the transmission. For example, X may be 2 symbols when the transmission is performed using 15 kHz subcarrier spacing (SCS); 4 symbols when the transmission is performed using 30 kHz SCS; or 8 symbols when the transmission is performed using 60 kHz SCS. Other embodiments may include other numbers of symbols. In some embodiments, limiting the transmission to the non-initiating UE to X symbols may be done when the base station does not specifically provide an ED threshold for COT sharing.

In another example, the categories of allowable transmissions of a non-initiating UE (for example, UE 112) in a UE-initiated COT may be defined. For example, a first category of allowed transmissions by the non-initiating UE transmissions may include uplink signals and downlink signals (both control and data); a second category may include only downlink signals (control and data); and a third category may include uplink control signals (for example, a scheduling request) and downlink signals (control and data).

In some embodiments, restrictions on the number of non-initiating UEs for which the base station 108 may acquire a channel from an initiating UE may be imposed. For example, if the base station 108 acquires a UE-initiated COT from UE 104, it may only transmit to X non-initiating UEs, where X is an integer that is one or greater. The value of X may be selected in accordance with the objectives of a particular embodiment. This may prevent the base station 108 from acquiring a UE-initiated COT and transmitting to a large number of additional UEs. The value of X may depend on the dimension that is used to separate the users. For example, if separated in the spatial domain, X may be limited by the maximum number of spatial layers, spatial streams or spatial transport blocks supported by the gNB.

In some embodiments, the base station 108 may be restricted to transmitting/receiving information to/from UE 112 only when the base station 108 is also transmitting/receiving information to/from UE 104. An example of this is shown in FIG. 4. The information, in this context, may include user plane data in unicast transmissions to either/both UEs. Thus, any transmissions to/from the non-initiating UE may be permitted in the COT as long as there is a simultaneous transmission to/from the initiating UE. Additional restrictions may be placed to ensure that the initiating UE is transmitting at the same rate for the duration of the COT, for example, before COT sharing and after COT sharing.

In some embodiments, restrictions may be imposed with respect to channel access for the purposes of sharing a UE-initiated COT with a non-initiating UE. For example, the base station 108 may only acquire a UE-initiated COT from an initiating UE for the benefit of a non-initiating UE in the event that an absence of any other technology (for example, a WLAN technology) sharing the channel can be assured (for example, guaranteed). The absence of another technology sharing the channel may be assured by regulations, private premises policies, etc.

In some embodiments, the base station 108 may configure UE 104 or UE 112 with ED thresholds that may be used for the purpose of sharing a UE-initiated COT with the non-initiating UE. For example, the base station 108 may configure the UE 104 with a first ED threshold. If the UE 104 performs the channel access procedures and the sensed channel has energy less than the first ED threshold, the base station 108 may be able to share the acquired channel with one or more non-initiating UEs. In some embodiments, UE 104 may, upon acquiring the channel, provide an indication to the base station 108 as to whether the UE-initiated COT is available for sharing with a non-initiating UE based on the comparison of the sensed channel energy to the first ED threshold during the channel access procedure.

In another example, the base station 108 may configure the UE 112 with a second ED threshold that the UE 112 is to use prior to accessing the channel, or portion thereof, acquired for its benefit by the base station 108. For example, the UE 112 may use the second ED threshold in an LBT procedure prior to performing transmission at UE2 Tx 336 of FIG. 3 or UE2 Tx 436 of FIG. 4.

Figure 5:
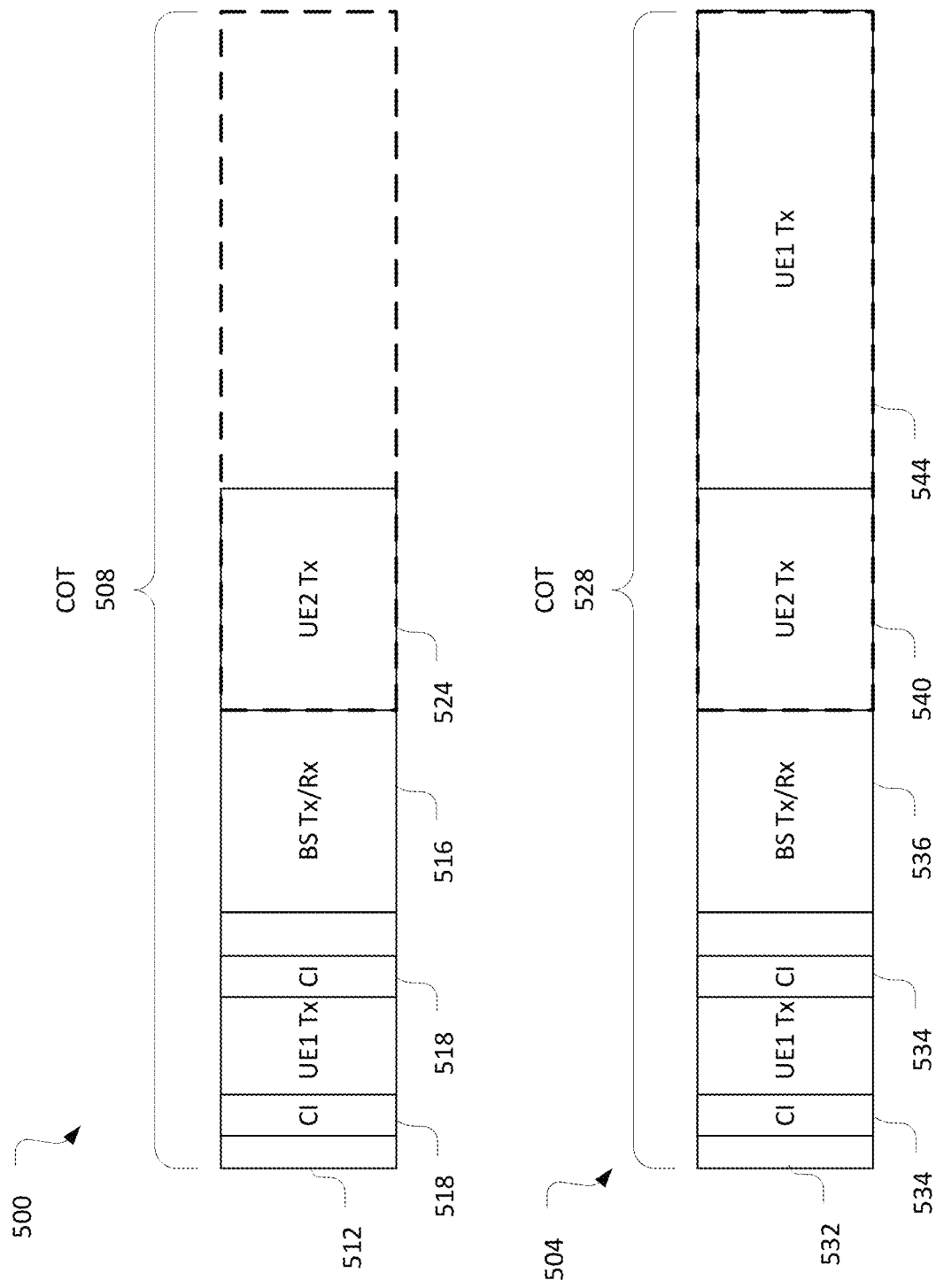
FIG. 5 illustrates another channel access diagram in accordance with some embodiments.

FIG. 5 illustrates a channel access diagram 500 and a channel access diagram 504 in accordance with some embodiments. The channel access diagrams 500/504 illustrate options for the base station 108 cancelling a transmission of the initiating UE 104 in the UE-initiated COT to enable transmission/reception by the non-initiating UE 112 in accordance with a second aspect of the disclosure.

The channel access diagram 500 may include a UE-initiated COT 508 that results from UE 104 successfully performing a channel access procedure and acquiring the channel as discussed above. UE 104 may provide the base station 108 with information that includes an indication that the UE 104 has acquired the channel for the UE-initiated COT 508. Upon acquiring the channel, the UE 104 may perform uplink transmissions at UE1 Tx 512 and the base station 108 may perform downlink/uplink transmissions at BS Tx/Rx 516.

During UE1 Tx 512, the base station 108 may transmit one or more cancellation indicators (CIs) 518 (two CIs shown, but other embodiments may include other numbers) to cancel the uplink transmission from the UE 104. The CIs 518 may be transmitted in downlink control information (DCI) using a CI-radio-network temporary identifier (RNTI). In some embodiments, the UE 104 may be configured with a COT Tx cancellation information element (IE) that provides information as to where, when, and how the CIs 518 are to be transmitted. For example, the COT Tx cancellation IE may provide an indication of a DCI payload size, aggregation level, number of PDCCH candidates to monitor, monitoring periodicity (which may be at slot level or symbol level), etc. This information may configure the UE 104 to monitor a PDCCH that transmits the CIs 518. This may involve pausing the uplink transmission at UE1 Tx 512 to check for the DCI. In some embodiments, the COT Tx cancellation procedure may be similar to the cancellation procedures described in 3GPP TS 38.213 v16.5.0 (2021-03) and the COT Tx cancellation IE may be similar to the uplink cancellation IE described in 3GPP TS 38.331 v16.4.1 (2021-03).

After the CIs 518 cut short the UE1 Tx 512, the base station 108 may transmit control signals in BS Tx/Rx 516 to obtain the channel from the UE 104 for the benefit of UE 112. After acquiring the channel for UE 112, unicast transmission/reception to/from the UE 104 may be stopped and unicast transmission/reception to/from UE 112 may be started. In this embodiment, UE 104 may not be allowed to continue transmission after the UE2 Tx 524.

The channel access diagram 504 may include a UE-initiated COT 528 that results from UE 104 successfully performing a channel access procedure and acquiring the channel as discussed above. UE 104 may provide the base station 108 with information that includes an indication that the UE 104 has acquired the channel for the UE-initiated COT 528. Upon acquiring the channel, the UE 104 may perform uplink transmissions at UE1 Tx 532 and the base station 108 may perform downlink/uplink transmissions at BS Tx/Rx 536.

During UE1 Tx 532, the base station 108 may transmit one or more cancellation indicators (CIs) 534 (two CIs shown, but other embodiments may include other numbers) to cancel the uplink transmission from the UE 104. The CIs 534 may be configured and transmitted in DCI as described above.

After the CIs 534 cut short the UE1 Tx 532, the base station 108 may transmit control signals in BS Tx/Rx 536 to obtain the channel from the UE 104 for the benefit of UE 112. After acquiring the channel for UE 112, unicast transmission/reception to/from the UE 104 may be stopped and unicast transmission/reception to/from UE 112 may be started. However, unlike channel access diagram 500, in channel access diagram 504, UE 104 may be allowed to resume transmission after transmissions to/from UE 112. For example, UE 104 may perform transmissions in UE1 Tx 544 after UE2 Tx 540. The UE1 Tx 544 may be scheduled by the base station 108. The scheduling information may be provided in BS Tx/Rx 536 or elsewhere.

In some embodiments, the number of cancellations allowed per COT may be limited. For example, only X number of cancellations may be allowed per COT, where X is one or another integer. This may limit the number of times the base station 108 can interrupt communications to/from an initiating UE for the benefit of a non-initiating UE.

In some embodiments, the duration of the COT Tx cancellation may be limited. For example, the CI may be considered an instruction to temporarily suspend uplink communications in the COT for a limited period of time. After which, the UE may again perform uplink transmissions, if desired.

In some embodiments, the UE 104 may transmit to the base station 108 for a duration (configured or specified such as, for example, a first or second slot boundary) after acquiring a COT. After reaching the end of the duration, which is less than the total COT length, the UE 104 may check to see if the base station 108 sends DCI to schedule the UE 104 or another UE. In this manner, the base station 108 may not need to send a cancellation signal and may send the scheduling DCI at the appropriate time to obtain a portion of the COT for a non-initiating UE.

In some embodiments, the base station 108 may provide the UE 112 with a modified ED threshold. Similar to the discussion above, the UE 112 may use the modified ED threshold to perform an LBT procedure prior to accessing the channel.

In order to accommodate embodiments of the present disclosure, various 3GPP TSs may be updated. For example, clause 4.1.3 of 3GPP TS 37.213 may be updated by deletion of the struck through text and addition of the underlined text as follows:

If a gNB shares a channel occupancy initiated by a UE using the channel access procedures described in clause 4.2.1.1 on a channel, the gNB may transmit a transmission that follows a UL transmission on scheduled resources or a PUSCH transmission on configured resources by the UE after a gap as follows:

The transmission may contain transmission to the UE that initiated the channel occupancy and can include non-unicast and/or unicast transmissions.

Alternative 1: Where there is no restriction on the unicast transmission that includes user plane data;

Alternative 2: Where any unicast transmission that includes user plane data is limited to a maximum of X symbols if it does not include information that is transmitted to the UE that initiated the channel occupancy;

Alternative 3: Where any unicast transmission that includes user plane data must include information transmitted to the UE that initiated the channel occupancy;

If the higher layer parameters ul-toDL-COT-SharingED-Threshold-new is not provided, the transmission may not include any unicast transmissions with user plane data or the transmission duration of the unicast data is not more than the duration of 2, 4 and 8 symbols for subcarrier spacing of 15, 30 and 60 kHz of the corresponding channel, respectively.

. . .

For the case where a gNB shares a channel occupancy initiated by a UE with configured grant PUSCH transmission, the gNB may transmit a transmission that follows the configured grant PUSCH transmission by the UE as follows:

If the higher layer parameter ul-toDL-COT-SharingED-Threshold-new is provided, the UE is configured by cg-COT-SharingList-new where provides a table configured by higher layer. Each row of the table provides a channel occupancy sharing information given by higher layer parameter cg-COT-Sharing-new. One row of the table is configured for indicating that the channel occupancy sharing is not available.

Alternative 1: Some rows of the table are configured for indicating that channel occupancy sharing with another UE is allowed.

Alternative 2: A new parameter may be used to indicate UE COT sharing is allowed.

If the 'COT sharing information' in CG-UCI detected in slot n indicates a row index that corresponds to a CG-COT-Sharing-new that provides channel occupancy sharing information, the gNB can share the UE channel occupancy assuming a channel access priority class p=channelAccessPriority-r16, starting from slot n+O, where O=offset-r16 slots, for a duration of D=duration-r16 slots where duration-r16, offset-r16, and channelAccessPriority-r16 are higher layer parameters provided by CG-COT-Sharing-r16.

Alternative 1: If rows within the table are configured to allow UE channel occupancy sharing, then the UE can expect COT sharing if x=UE_allowed (semi-static)

Alternative 2: If parameter indicates new UE COT sharing allowed, CG-UCI may contain a bit indicating if UE COT sharing enabled (dynamic).

The "alternatives" described above may not be mutually exclusive. For example, one alternative may be used in conjunction with another alternative. In the above modifications to the text of 3GPP TS 37.213, the following definitions for the new parameters may be used. The parameter ul-toDL-COT-SharingED-Threshold-new may be a maximum energy detection threshold that the UE should use to share channel occupancy with gNB for DL transmission. The parameter cg-COT-SharingList-new indicates a table for COT sharing combinations, in which one row can be set to noCOT-Sharing to indicate that there is no channel occupancy sharing. The parameter CG-COT-Sharing-new may include a channel access priority to indicate a channel access priority class that the gNB can assume when sharing the UE-initiated COT; a duration to indicate a number of DL transmission slots within the UE-initiated COT; or an offset to indicate the number of DL transmission slots from the end of the slot where CG-UCI is detected after which COT sharing can be used.

The alternative 1 "where there is no restriction on the unicast transmission that includes user plane data" may correspond to aspects of FIG. 2 and related discussion.

The alternative 2 "where any unicast transmission that includes user plane data is limited to a maximum of X symbols if it does not include information that is transmitted to the UE that initiated the channel occupancy" may correspond to aspects of FIG. 3 and related discussion.

The alternative 3 "where any unicast transmission that includes user plane data must include information transmitted to the UE that initiated the channel occupancy" may correspond to aspects of FIG. 4 and related discussion.

The alternative 1 "If rows within the table are configured to allow UE channel occupancy sharing, then the UE can expect COT sharing if x=UE_allowed (semi-static)" may correspond to aspects of above-described scenarios in which the base station captures a UE-initiated COT during UE1 Tx or the base station cancels a transmission of an initiating UE in the UE-initiated COT to enable transmission/reception by a non-initiating UE.

Figure 6:
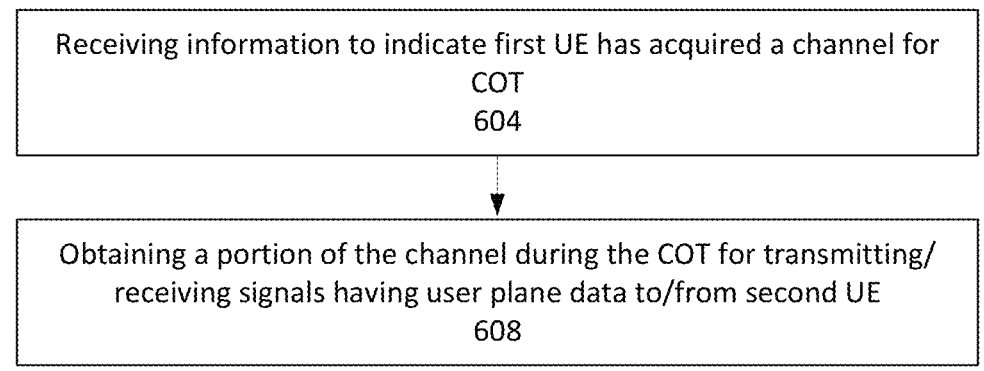
FIG. 6 illustrates an operational flow/algorithmic structure in accordance with some embodiments.
Figure 7:
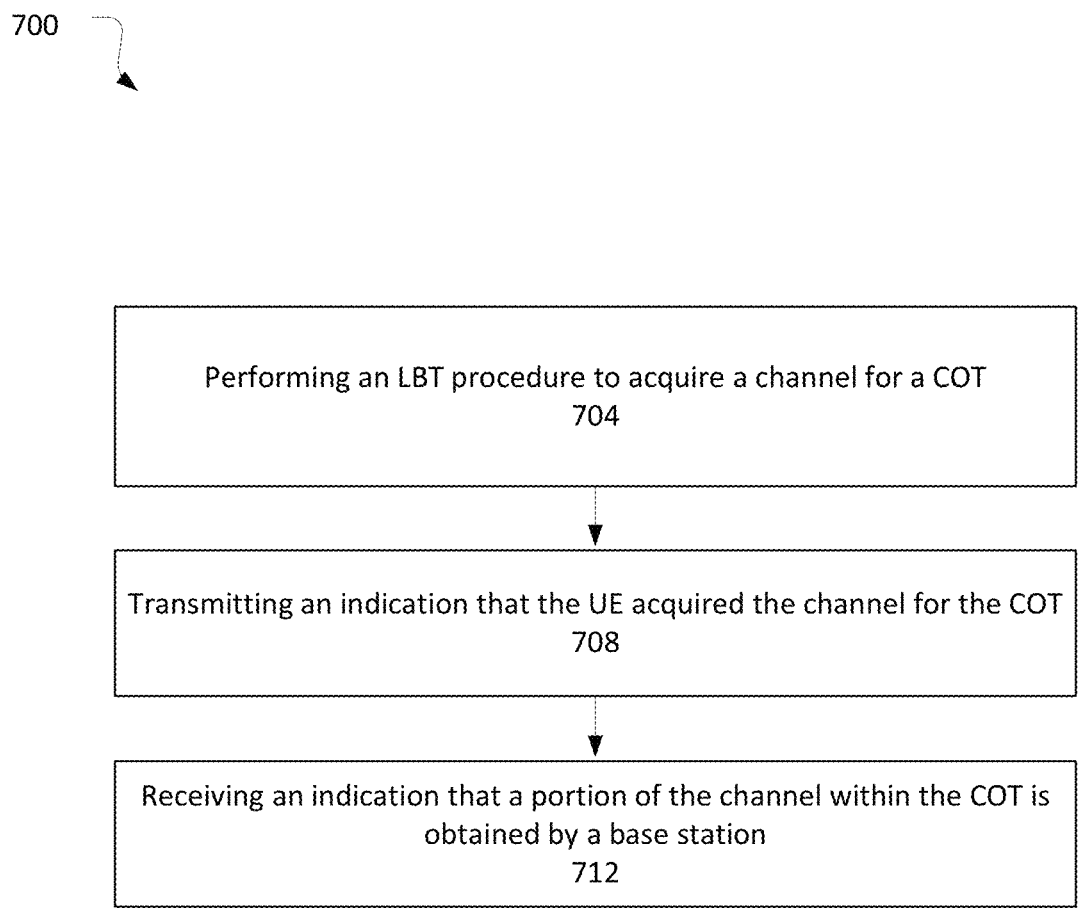
FIG. 7 illustrates another operational flow/algorithmic structure in accordance with some embodiments.
Figure 8:
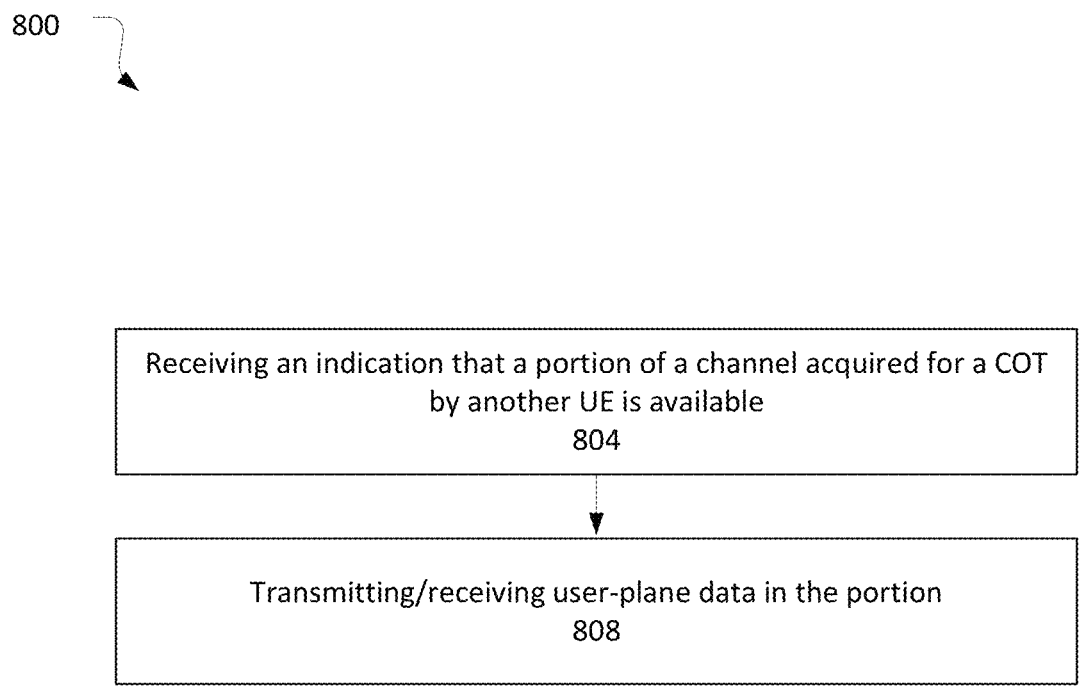
FIG. 8 illustrates another operational flow/algorithmic structure in accordance with some embodiments.

FIGS. 6-8 present a number of operation flows/algorithmic structures in accordance with aspects of this disclosure. These operation flow/algorithmic structures describe a number of operations in a particular sequence. However, the presented sequences are not restrictive. That is, the operations may be performed in sequences other than those specifically presented.

FIG. 6 illustrates an operational flow/algorithmic structure 600 in accordance with some embodiments. The operation flow/algorithmic structure 600 may be performed or implemented by a base station such as, for example, base station 108 or 1000; or components thereof, for example, baseband processor circuitry 1004A.

The operation flow/algorithmic structure 600 may include, at 604, receiving, from a first UE, information to indicate the first UE has acquired a channel for a COT. The first UE may correspond to an initiating-UE (for example, UE 104) described herein. In some embodiments, the information may be receiving an uplink transmission from the initiating UE.

The operation flow/algorithmic structure 600 may further include, at 608, obtaining a portion of the channel during the COT for transmitting/receiving signals having user plane data to/from the second UE. The base station may provide an indication of the obtained portion to the first or second UE.

While embodiments describe obtaining the channel for the benefit of the second UE, other embodiments include obtaining a channel for the benefit of a plurality of UEs other than the initiating UE. The number of UEs for which the channel may be obtained may be limited to a predetermined number in various embodiments.

In some embodiments, the base station may obtain the portion of the channel for the benefit of the second UE after the first UE completes one or more transmissions using the channel. In other embodiments, the base station may obtain the portion of the channel for the benefit of the second UE by actively canceling transmissions from the first UE on the channel. For example, the base station may not wait until the first UE naturally concludes its transmissions and, instead, may transmit a cancellation indicator to instruct the first UE to cancel its uplink transmissions. The cancellation indicator may be transmitted using DCI. In some embodiments, a number or duration of cancellations of uplink transmissions from the first UE may be restricted.

The portion obtained for the benefit of the second UE may be a subset of the available resources of the channel in time, frequency, or space. In some embodiments, the subset may include all the resources of the COT that remain after the base station obtains the portion. In other embodiments, the subset may include only some of the resources of the COT that remain after the base station obtains the portion. A portion of the COT not obtained for the benefit of the second UE may either be canceled or provided back to the initiating UE. In some embodiments, to cancel the portion of the COT not obtained for the benefit of the second UE, the base station may broadcast a signal to indicate that the restrictions imposed by effect of the COT may be removed, thereby making the corresponding resources available to any device.

The portion obtained for the benefit of the second UE may be used for a number of categories of communication. For example, a first category of communication may include transmission of any downlink signals (for example, control or data) to the second UE. A second category of communication may include reception of uplink control signaling from the second UE and transmission of any downlink signals (for example, control or data) to the second UE. A third category of communication may include reception of any uplink signals (for example, control or data) from the second UE and transmission of any downlink signals (for example, control or data) to the second UE.

In some embodiments, the base station may provide the first UE with one or more ED thresholds to use in LBT procedures to acquire the channel for COT. Alternatively, the first UE may be preconfigured with the one or more ED thresholds.

Individual ED thresholds may be associated with different sharing restrictions. For example, if the first UE acquires the channel based on a first ED threshold, the base station may determine that it is free to obtain the portion of the channel for the benefit of a second UE with little or no restrictions. However, if the first UE acquires a channel based on a second ED threshold, the base station may determine that it is not able to obtain the portion of the channel for the benefit of second UE or is only able to obtain the portion of the channel for the benefit of the second UE for a limited period. The limited period may be for X symbols, where X is two if a subcarrier spacing of the portion is 15 kHz, four if the subcarrier spacing of the portion is 30 kHz; or eight if the subcarrier spacing of the portion is 60 kHz.

In some embodiments, the first UE may provide the base station with an indication of the ED threshold used to acquire the channel. This may provide the base station with information that it may use to determine any restrictions on obtaining the channel for the benefit of the second UE.

In some embodiments, the base station may provide the second UE with one or more ED thresholds to use in LBT procedures to utilize the portion of the channel obtained for the benefit of the second UE. The LBT procedures may be category 1 LBT or category 2 LBT for uplink access.

FIG. 7 illustrates an operation flow/algorithmic structure 700 in accordance with some embodiments. The operation flow/algorithmic structure 700 may be performed or implemented by an initiating UE such as, for example, UE 104 or UE 900; or components thereof, for example, baseband processor 904A.

The operation flow/algorithmic structure 700 may include, at 704, performing an LBT procedure to acquire a channel for a COT. In some embodiments, the LBT procedure may be based on an ED threshold provided by a base station for the purposes of acquiring a COT that may be shared with one or more other UEs.

In some embodiments, the base station may provide the UE with additional/alternative configuration information to enable or otherwise facilitate sharing of a UE-initiated COT with a non-initiating UE. For example, the base station may provide a configured grant COT sharing list parameter that provides a table with rows that indicate that channel occupancy sharing with another UE is allowed. The configured grant COT sharing list parameter may be semi-statically configured at a start of operation of the UE. This configuration information may alternatively be dynamically provided/updated by a separate parameter during operation of the UE.

The operation flow/algorithmic structure 700 may further include, at 708, transmitting an indication that the UE acquired the channel for the COT. In some embodiments, the UE may also provide an indication of the ED threshold used to acquire the channel for the COT. This may be done by setting a bit within a configured grant-uplink control information (CG-UCI) to indicate whether UE COT sharing is enabled.

The operation flow/algorithmic structure 700 may further include, at 712, receiving an indication that a portion of the channel within the COT is obtained by a base station. As described above, the portion obtained by the base station may include all or some of the remaining portion of the resources of the COT. In the event that only some of the remaining portion of the resources are obtained by the base station, and the base station has not otherwise canceled the non-obtained portion, the non-obtained portion of the resources may be used by the UE.

FIG. 8 illustrates an operational flow/algorithmic structure 800 in accordance with some embodiments. The operation flow/algorithmic structure 800 may be performed or implemented by a non-initiating UE such as, for example, UE 112 or UE 900; or components thereof, for example, baseband processor circuitry 904A.

The operation flow/algorithmic structure 800 may include, at 804, receiving an indication that a portion of a channel acquired for a COT by another UE is available to the non-initiating UE. The indication may be an explicit indication using DCI, or it may be an implicit indication based on scheduling information received from the base station. For example, the non-initiating UE may receive a DCI that schedules an uplink or downlink transmission within a portion of a COT acquired by another UE. The non-initiating UE may then determine that the base station has obtained the portion for the benefit of the non-initiating UE.

The indication of the portion may identify time/frequency resources that define the portion available to the non-initiating UE.

In some embodiments, the base station may also provide an indication of whether the non-initiating UE is to perform an LBT procedure before accessing the portion for communications. The base station may also provide a specific ED threshold to use for this LBT procedure.

The operation flow/algorithmic structure 800 may further include, at 808, transmitting or receiving user-plane data in the portion. In some embodiments, this may be performed after performing the LBT procedure with the specified ED threshold.

Figure 9:
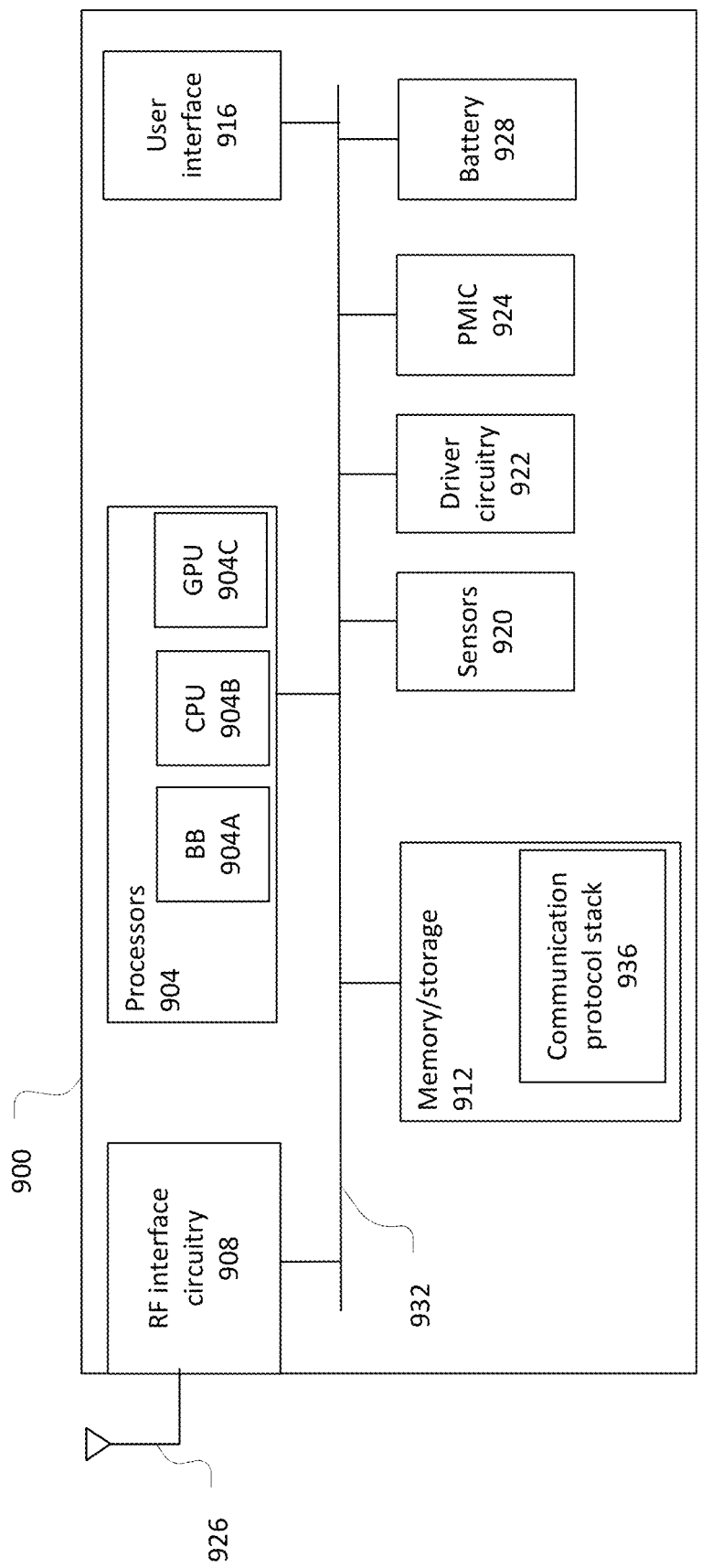
FIG. 9 illustrates a user equipment in accordance with some embodiments.

FIG. 9 illustrates a UE 900 in accordance with some embodiments. The UE 900 may be similar to and substantially interchangeable with UE 104 or UE 112.

The UE 900 may be any mobile or non-mobile computing device, such as a mobile phone, computer, tablet, industrial wireless sensor (for example, microphone, carbon dioxide sensor, pressure sensor, humidity sensor, thermometer, motion sensor, accelerometer, laser scanner, fluid level sensor, inventory sensor, electric voltage/current meter, or actuator), video surveillance/monitoring device (for example, a video camera), wearable device (for example, a smart watch), or Internet-of-things device.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, optical connection, etc. that allows various circuit components (on common or different chips or chipsets) to interact with one another.

The processors 904 may include processor circuitry such as baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM (CP-OFDM) in the uplink or downlink and discrete Fourier transform spread OFDM (DFT-S-OFDM) in the uplink.

The memory/storage 912 may include one or more non-transitory, computer-readable media that includes instructions (for example, communication protocol stack 936) that may be executed by one or more of the processors 904 to cause the UE 900 to perform various operations described herein. The memory/storage 912 may also store COT-sharing configuration information and ED thresholds as described elsewhere.

The memory/storage 912 include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include microstrip antennas, printed antennas fabricated on the surface of one or more printed circuit boards, patch antennas, or phased array antennas. The antenna 926 may have one or more panels designed for specific frequency bands including bands in FR1 or FR2.

The user interface 916 includes various input/output (I/O) devices designed to enable user interaction with the UE 900. The user interface 916 includes input device circuitry and output device circuitry. Input device circuitry includes any physical or virtual means for accepting an input including, for example, one or more physical or virtual buttons (for example, a reset button), a physical keyboard, keypad, mouse, touchpad, touchscreen, microphones, scanner, or headset. The output device circuitry includes any physical or virtual means for showing information or otherwise conveying information, such as sensor readings, actuator position(s), or other like information. Output device circuitry may include any number or combinations of audio or visual display, including, for example, one or more simple visual outputs/indicators (for example, binary status indicators such as light emitting diodes (LEDs) and multi-character visual outputs), or more complex outputs, such as display devices or touchscreens (for example, liquid crystal displays (LCDs), LED displays, quantum dot displays, or projectors) with the output of characters, graphics, multimedia objects, and the like being generated or produced from the operation of the UE 900.

The sensors 920 may include devices, modules, or subsystems whose purpose is to detect events or changes in its environment and send the information (sensor data) about the detected events to some other device, module, subsystem, etc. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lens-less apertures); light detection and ranging sensors; proximity sensors (for example, infrared radiation detector and the like); depth sensors; ambient light sensors; ultrasonic transceivers; and microphones.

The driver circuitry 922 may include software and hardware elements that operate to control particular devices that are embedded in the UE 900, attached to the UE 1100, or otherwise communicatively coupled with the UE 900. The driver circuitry 922 may include individual drivers allowing other components to interact with or control various input/output (I/O) devices that may be present within or connected to the UE 900. For example, driver circuitry 922 may include: a display driver to control and allow access to a display device; a touchscreen driver to control and allow access to a touchscreen interface; sensor drivers to obtain sensor readings of sensor circuitry 920 and control and allow access to sensor circuitry 920; drivers to obtain actuator positions of electro-mechanic components or control and allow access to the electro-mechanic components; a camera driver to control and allow access to an embedded image capture device; and audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

A battery 928 may power the UE 900, although in some examples the UE 900 may be mounted deployed in a fixed location, and may have a power supply coupled to an electrical grid. The battery 928 may be a lithium-ion battery or a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
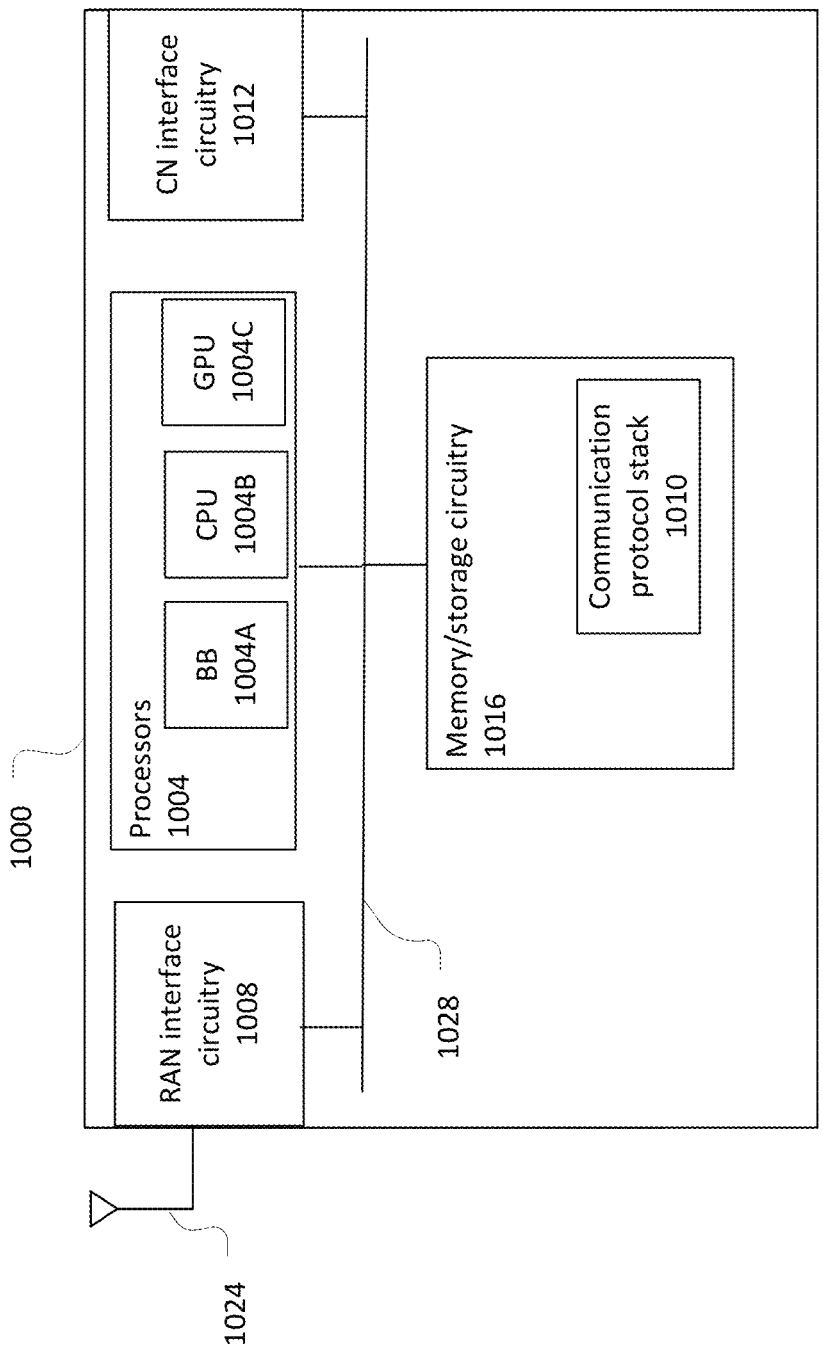
FIG. 10 illustrates a base station in accordance with some embodiments.

FIG. 10 illustrates a base station 1000 in accordance with some embodiments. The base station 1000 may be similar to and substantially interchangeable with base station 108.

The base station 1000 may include processors 1004, RF interface circuitry 1008, core network (CN) interface circuitry 1012, memory/storage circuitry 1016, and antenna structure 1026.

The components of the base station 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 9.

The CN interface circuitry 1012 may provide connectivity to a core network, for example, a $5^{th}$ Generation Core network (5GC) using a 5GC-compatible network interface protocol such as carrier Ethernet protocols or some other suitable protocol. Network connectivity may be provided to/from the base station 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate in accordance with one or more of the examples set forth below. For another example, circuitry associated with a UE, base station, network element, etc., as described above in connection with one or more of the preceding figures may be configured to operate in accordance with one or more of the examples set forth below in the example section.

Examples

In the following sections, further exemplary embodiments are provided.

Example 1 includes a method of operating a base station, the method comprising: receiving, from a first user equipment (UE), information to indicate the first UE has acquired a channel for a channel occupancy time (COT); and obtaining a portion of the channel during the COT for transmitting signals having user plane data to, or receiving signals from, a second UE.

Example 2 includes the method of example 1 or some other example, further comprising: obtaining the portion of the channel from the first UE after the first UE completes transmissions using the channel.

Example 3 includes the method of example 1 or some other example, further comprising: canceling transmissions from the first UE on the channel; and obtaining the portion of the channel from the first UE based on canceling the transmissions from the first UE.

Example 4 includes the method of example 3 or some other example, wherein canceling transmissions from the first UE comprises: transmitting downlink control information (DCI) with a cancellation indicator.

Example 5 includes the method of example 3 or some other example, wherein canceling transmissions from the first UE comprises: determining that transmissions from the first UE on the channel during the COT have not been canceled more than a predetermined threshold; and canceling the transmissions from the first UE based on said determining.

Example 6 includes the method of example 1 or some other example, further comprising: providing, to the second UE, an indication of a duration of the portion.

Example 7 includes the method of example 6 or some other example, wherein providing the indication of the duration comprises: transmitting downlink control information with an indicator to indicate the duration; or scheduling transmissions to or from the second UE with a length that corresponds to the duration.

Example 8 includes the method of example 1 or some other example, wherein the portion is a subset of available resources of the channel in time, frequency, space, or some combination thereof.

Example 9 includes the method of example 1 or some other example, further comprising: transmitting an indication of the portion to the second UE.

Example 10 includes the method of example 1 or some other example, wherein the portion is a second portion and the method further comprises: transmitting signals to, or receiving signals from, the first UE using a first portion of the channel during the COT, wherein the first portion and the second portion overlap in a time domain.

Example 11 includes the method of example 1 or some other example, wherein the portion is to be used for: transmitting any downlink signals to the second UE; receiving uplink control signaling from the second UE and transmitting any downlink signals to the second UE; or receiving any uplink signals from the second UE and transmitting any downlink signals to the second UE.

Example 12 includes the method of example 1 or some other example, wherein the portion is two symbols if a subcarrier spacing of the portion is 15 kHz, four symbols if the subcarrier spacing of the portion is 30 kHz; or eight symbols if the subcarrier spacing of the portion is 60 kHz.

Example 13 includes the method of example 1 or some other example, further comprising: configuring the first UE with an energy detection threshold; and obtaining the portion of the channel based on a determination that the first UE performed a successful listen before talk (LBT) operation using the energy detection threshold.

Example 14 includes a method of operating a user equipment (UE), the method comprising: performing a listen-before-talk (LBT) procedure to acquire a channel for a channel occupancy time (COT); transmitting, to a base station, an indication that the UE acquired the channel for the COT; and receiving, from the base station, an indication that a portion of the channel within the COT is obtained by the base station.

Example 15 includes the method of example 14 or some other example, further comprising: receiving, from the base station, an indication of time or frequency resources of the portion of the channel within the COT obtained by the base station.

Example 16 includes the method of example 14 or some other example, wherein the portion is a first portion of the channel within the COT and the method further comprising: receiving, from the base station, an indication of time or frequency resources of a second portion of the channel within the COT that is available for transmissions by the UE.

Example 17 includes the method of example 14 or some other example, further comprising: receiving, from the base station, a cancellation indicator to cancel an uplink transmission of the UE on the portion of the channel within the COT obtained by the base station.

Example 18 includes the method of example 14 or some other example, further comprising: receiving, from the base station, an indication of an energy detection threshold; and performing the LBT procedure based on the energy detection threshold.

Example 19 includes the method of example 18 or some other example, further comprising: transmitting, to the base station, an indication that the energy detection threshold was used to acquire the channel for the COT.

Example 20 includes the method of example 14 or some other example, further comprising: receiving, from the base station, configuration information to indicate channel occupancy sharing with another UE is allowed.

Example 21 includes the method of example 20 or some other example, wherein the configuration information is a configured grant COT sharing list parameter to configure a table or is a parameter separate from the configured grant COT sharing list parameter.

Example 22 includes the method of example 20 or some other example, further comprising: transmitting, to the base station, configured grant-uplink control information that includes a bit to indicate whether UE COT sharing is enabled.

Example 23 includes a method of operating a user equipment (UE), the method comprising: receiving, from a base station, an indication that a portion of a channel acquired for a channel occupancy time (COT) by another UE is available to the UE; and transmitting or receiving user-plane data in the portion.

Example 24 includes the method of example 23 or some other example, further wherein the indication is an explicit indication in downlink control information (DCI) or is an implicit indication based on scheduling information received from the base station.

Example 25 includes the method of example 23 or some other example, further comprising: receiving, from the base station, an indication of an energy detection threshold; performing a listen-before-talk (LBT) procedure based on the energy detection threshold; and transmitting user plane data in the portion based on the LBT procedure.

Example 26 may include an apparatus comprising means to perform one or more elements of a method described in or related to any of examples 1-25, or any other method or process described herein.

Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 may include an apparatus comprising logic, modules, or circuitry to perform one or more elements of a method described in or related to any of examples 1-25, or any other method or process described herein.

Example 29 may include a method, technique, or process as described in or related to any of examples 1-25, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof.

Example 31 may include a signal as described in or related to any of examples 1-25, or portions or parts thereof.

Example 32 may include a datagram, information element, packet, frame, segment, PDU, or message as described in or related to any of examples 1-25, or portions or parts thereof, or otherwise described in the present disclosure.

Example 33 may include a signal encoded with data as described in or related to any of examples 1-25, or portions or parts thereof, or otherwise described in the present disclosure.

Example 34 may include a signal encoded with a datagram, TE, packet, frame, segment, PDU, or message as described in or related to any of examples 1-25, or portions or parts thereof, or otherwise described in the present disclosure.

Example 35 may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Example 36 may include a computer program comprising instructions, wherein execution of the program by a processing element is to cause the processing element to carry out the method, techniques, or process as described in or related to any of examples 1-25, or portions thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of operating a base station, the method comprising:
   processing information received from a first user equipment (UE), to indicate the first UE has acquired a channel for a channel occupancy time (COT);
   obtaining a portion of the channel during the COT for transmitting signals having user plane data to, or receiving signals from, a second UE; and
   generating, for transmission to the first UE, an indication that the portion of the channel within the COT is obtained.

2. The method of claim 1, further comprising:
   obtaining the portion of the channel from the first UE after the first UE completes transmissions using the channel.

3. The method of claim 1, further comprising:
   canceling transmissions from the first UE on the channel; and
   obtaining the portion of the channel from the first UE based on canceling the transmissions from the first UE.

4. The method of claim 3, wherein canceling transmissions from the first UE comprises: transmitting downlink control information (DCI) with a cancellation indicator.

5. The method of claim 3, wherein canceling transmissions from the first UE comprises:
   determining that transmissions from the first UE on the channel during the COT have not been canceled more than a predetermined threshold; and canceling the transmissions from the first UE based on said determining.

6. The method of claim 1, further comprising:
   providing, to the second UE, an indication of a duration of the portion.

7. The method of claim 6, wherein providing the indication of the duration comprises:
   generating downlink control information with an indicator to indicate the duration; or
   generating information to schedule transmissions to or from the second UE with a length that corresponds to the duration.

8. The method of claim 1, wherein the portion is a subset of available resources of the channel in time, frequency, or space.

9. The method of claim 1, further comprising:
   generating an indication of the portion to the second UE.

10. The method of claim 1, wherein the portion is a second portion and the method further comprises:
    generating signals to be transmitted to, or processing signals received from, the first UE using a first portion of the channel during the COT, wherein the first portion and the second portion overlap in a time domain.

11. The method of claim 1, wherein the portion is to be used for:

generating any downlink signals to be transmitted to the second UE;
processing uplink control signaling received from the second UE and generating any downlink signals to be transmitted to the second UE; or
processing any uplink signals received from the second UE and generating any downlink signals to be transmitted to the second UE.

12. The method of claim 1, wherein: the portion is two symbols and a subcarrier spacing of the portion is 15 kHz; the portion is four symbols and a subcarrier spacing of the portion is 30 kHz; or the portion is eight symbols and a subcarrier spacing of the portion is 60 kHz.

13. The method of claim 1, further comprising:
configuring the first UE with an energy detection threshold; and
obtaining the portion of the channel based on a determination that the first UE performed a successful listen before talk (LBT) operation using the energy detection threshold.

14. One or more non-transitory, computer-readable media having instructions that, when executed cause processing circuitry to:
perform a listen-before-talk (LBT) procedure to acquire a channel for a channel occupancy time (COT);
generate an indication, to be transmitted to a base station, that a user equipment (UE) acquired the channel for the COT; and
process an indication, received from the base station, that a portion of the channel within the COT is obtained.

15. The one or more non-transitory, computer-readable media of claim 14, wherein the portion is a first portion of the channel within the COT and the instructions, when executed, further cause the processing circuitry to:
process an indication of time or frequency resources of a second portion of the channel, received from the base station, within the COT that is available for transmissions by the UE.

16. The one or more non-transitory, computer-readable media of claim 14, wherein the instructions, when executed further cause the processing circuitry to:
process a cancellation indicator, received from the base station, to cancel an uplink transmission of the UE on the portion of the channel within the COT obtained.

17. The one or more non-transitory, computer-readable media of claim 14, wherein the instructions, when executed further cause the processing circuitry to:
process an indication, received from the base station, of an energy detection threshold;
perform the LBT procedure based on the energy detection threshold; and
generate an indication, to be transmitted to the base station, that the energy detection threshold was used to acquire the channel for the COT.

18. An apparatus comprising:
processing circuitry, coupled with the memory, the processing circuitry to:
process by a user equipment (UE), an indication, received from a base station, that a portion of a channel acquired for a channel occupancy time (COT) by another UE is available to the UE; and
generate or process the user-plane data in the portion; and
interface circuitry coupled with the processing circuitry to enable communication.

19. The apparatus of claim 18, wherein the indication is an explicit indication in downlink control information (DCI) or is an implicit indication based on scheduling information received from the base station.

20. The apparatus of claim 18, wherein the processing circuitry is further to:
process an indication, received from the base station, of an energy detection threshold;
perform a listen-before-talk (LBT) procedure based on the energy detection threshold; and
generate user plane data in the portion based on the LBT procedure.

* * * * *